US012561297B2

(12) United States Patent　　　　　　(10) Patent No.:　US 12,561,297 B2
　　Thatavarthy et al.　　　　　　　　　　(45) Date of Patent:　　Feb. 24, 2026

(54) RULE REMEDIATION ACTIONS

(71) Applicant: SAP SE, Walldorf (DE)

(72) Inventors: Prasanthi Thatavarthy, Onalaska, WI
　　　　　　　(US); Michael Bouska, Onalaska, WI
　　　　　　　(US); Jeffrey Woody, Onalaska, WI
　　　　　　　(US); Alexander Hammer, La
　　　　　　　Crescent, MN (US); Katlin Svendsen,
　　　　　　　Onalaska, WI (US)

(73) Assignee: SAP SE, Walldorf (DE)

( * ) Notice:　Subject to any disclaimer, the term of this
　　　　　　patent is extended or adjusted under 35
　　　　　　U.S.C. 154(b) by 0 days.

(21) Appl. No.: 18/625,765

(22) Filed:　　Apr. 3, 2024

(65)　　　　　　Prior Publication Data

US 2025/0315415 A1　　Oct. 9, 2025

(51) Int. Cl.
　　*G06F 16/215*　　　(2019.01)
　　*G06F 11/07*　　　　(2006.01)
　　*G06F 16/23*　　　　(2019.01)
(52) U.S. Cl.
　　CPC ........ *G06F 16/215* (2019.01); *G06F 11/0769*
　　　　　　(2013.01); *G06F 16/2365* (2019.01)
(58) Field of Classification Search
　　CPC . G06F 16/215; G06F 16/2365; G06F 11/0769
　　USPC ........................................ 707/687
　　See application file for complete search history.

(56)　　　　　References Cited

U.S. PATENT DOCUMENTS 9,501,504 B2　11/2016　Dupey et al.
　9,779,146 B2　10/2017　Thatavarthy et al.
　9,805,072 B2　10/2017　Spiess et al.

10,140,337 B2　11/2018　Champlin et al.
　10,311,155 B2　 6/2019　Dupey et al.
　10,324,783 B1 *　 6/2019　Saha ................... G06Q 10/0633
　10,528,454 B1 *　 1/2020　Baraty ................ G06F 11/3684
　10,534,761 B2　 1/2020　Dupey et al.
　10,599,641 B2　 3/2020　Spiess et al.
　10,831,730 B2　11/2020　Dupey et al.
　11,010,391 B2　 5/2021　Kumar et al.
　11,196,627 B1 *　12/2021　Khoo ..................... H04L 63/102
　11,620,558 B1 *　 4/2023　Xu ............................ G06N 7/01
　　　　　　　　　　　　　　　　　　　706/12
　2015/0193511 A1　 7/2015　Woody et al.
　2016/0306827 A1 *　10/2016　Dos Santos ............. G06F 16/25
　2016/0364325 A1 *　12/2016　Ouzzani .............. G06F 11/3684
　2017/0131106 A1　 5/2017　Dupey et al.

(Continued)

*Primary Examiner* — Cam Linh T Nguyen

(74) *Attorney, Agent, or Firm* — Fish & Richardson P.C.

(57)　　　　　　　ABSTRACT

Methods, systems, and computer-readable storage media for
remediation management. Remediation rule definitions are
received. The definitions include a replacement remediation
action defining placeholder parameters and conditions for
replacing erroneous entries of a plurality of data tables to
remedy the erroneous entries of the plurality of data tables.
The remediation rule definitions are mapped to the data
tables. An identification of data tables to be verified is
received. Data of the data tables is verified to identify
erroneous entries. Remediation plans including applicable
remediation rule definitions mapped to the one or more data
tables are selected using a prediction model. A remediation
plan includes remediation rule definitions to correct the
erroneous entries in each of the data tables. The remediation
plan is applied to replace the erroneous entries in the one or
more data tables with corrected entries.

20 Claims, 7 Drawing Sheets

(56) References Cited

U.S. PATENT DOCUMENTS

| | | | |
|---|---|---|---|
| 2018/0107709 A1 | 4/2018 | Spiess et al. | |
| 2019/0324893 A1* | 10/2019 | Vaishnav | G06F 11/3698 |
| 2021/0109915 A1* | 4/2021 | Godden | G16H 10/60 |
| 2021/0182699 A1* | 6/2021 | Koyyalummal | G06F 11/079 |
| 2021/0263900 A1* | 8/2021 | Joyce | G06F 16/285 |
| 2022/0342779 A1* | 10/2022 | Minarik | G06F 11/3409 |
| 2023/0018199 A1* | 1/2023 | Mahamuni | G06F 11/3051 |
| 2023/0039566 A1* | 2/2023 | Ghag | G06F 11/0736 |
| 2024/0036965 A1* | 2/2024 | Habel | G06F 11/3034 |
| 2024/0126632 A1* | 4/2024 | Habel | G06F 11/0772 |
| 2024/0126636 A1* | 4/2024 | Habel | G06F 11/079 |
| 2024/0143752 A1* | 5/2024 | Campbell | G06F 21/554 |
| 2024/0161025 A1* | 5/2024 | Dechu | G06Q 10/063114 |
| 2024/0330489 A1* | 10/2024 | Le Bouthillier | G06F 21/604 |
| 2025/0004869 A1* | 1/2025 | Ezrielev | G06F 11/0709 |
| 2025/0106257 A1* | 3/2025 | Renda | H04L 63/10 |

* cited by examiner

| CUSTID 202 | NAME 204 | ADDRESS 206 | PHONE 208 | EMAIL 210 | COUNTRY 212 | OTHER 214 |
|---|---|---|---|---|---|---|
| 0001 222 | JOHN 224 | SMITH 226 | 228 | 230 | U.S.A. 232 | 234 |

200

300A

| CUSTID 202 | NAME 204 | ADDRESS 206 | PHONE 208 | EMAIL 210 | COUNTRY 212 | OTHER 214 |
|---|---|---|---|---|---|---|
| 0001 222 | JOHN 224 | SMITH 226 | 512684 302A | JOHND@EMAIL.COM 304 | U.S.A. 232 | 234 |

| CUSTID 202 | NAME 204 | ADDRESS 206 | PHONE 208 | EMAIL 210 | COUNTRY 212 | OTHER 214 |
|---|---|---|---|---|---|---|
| 0001 222 | JOHN 224 | SMITH 226 | (512)684-1111 302B | JOHND@EMAIL.COM 304 | U.S.A. 232 | CLASS A 234 |

RECEIVE RULE DEFINITIONS
402

MAP RULE DEFINITIONS TO DATA TABLES
404

RECEIVE IDENTIFICATION OF A DATA TABLE TO BE VERIFIED
406

VERIFY DATA IN DATA TABLE TO IDENTIFY ERRONEOUS ENTRIES
408

SELECT REMEDIATION
410

APPLY SELECTED REMEDIATION TO ERRONEOUS ENTRIES
412

420

RECEIVE IDENTIFICATION OF DATA TABLE
422

EXECUTE RULEBOOK
424

GENERATE FAILED DATA SAMPLE FOR EACH RULE
426

GENERATE REMEDIATION PREPARATION WITH SAMPLE DATA AND PLAN
428

VALIDATE REMEDIATION
430

REFINE PLAN ACTIONS
432

EXECUTE REMEDIATION OF COMPLETE DATA TABLE
434

VALIDATE REMEDIATION ON COMPLETE DATA TABLE
436

RULE REMEDIATION ACTIONS

TECHNICAL FIELD

The present disclosure relates to data quality rules. More particularly, implementations of the present disclosure are directed to rule remediation replacement actions.

BACKGROUND

Data quality rules are important for maintaining accurate and reliable datasets. For example, the data quality rules can be applied to validate values in a section of a dataset, relative to a particular data type, range, or format. The data quality rules can present a set of problems and limitations. Some challenges of the data quality rules are related to rule subjectivity, the complexity of rules, dynamic interdependencies of data analyzed by rules, cost and resources, false positives, data integration, and others. The correction of data identified by the data quality rules as being incorrect can also raise multiple challenges. These challenges can limit implementations of solutions aimed at fixing the incorrect data—especially if the dataset included multiple problems, or if the information related to the failed reason is incomplete.

SUMMARY

Implementations of the present disclosure are directed to data quality rules. More particularly, implementations of the present disclosure are directed to rule remediation replacement actions automatically triggered by identification of erroneous entries of a data table, potentially affecting an application.

In some implementations, a computer-implemented method includes: receiving, by one or more processors, remediation rule definitions including a replacement remediation action defining placeholder parameters and conditions for replacing erroneous entries of a plurality of data tables to remedy the erroneous entries of the plurality of data tables; mapping, by the one or more processors, the remediation rule definitions to the plurality of data tables; receiving, by the one or more processors, an identification of one or more data tables to be verified; verifying, by the one or more processors, data of the one or more data tables to identify erroneous entries in the one or more data tables; selecting, by the one or more processors, using a prediction model, from a plurality of remediation plans including applicable remediation rule definitions mapped to the one or more data tables, a remediation plan including one or more remediation rule definitions to correct the erroneous entries in each of the one or more data tables; and applying, by the one or more processors, the remediation plan to replace the erroneous entries in the one or more data tables with corrected entries.

The foregoing and other implementations can each optionally include one or more of the following features, alone or in combination. In particular, implementations can include one or more of the following features:

In an aspect, combinable with any of the previous aspects, wherein the remediation rule definitions include a link to a glossary entry for custom attributes. In another aspect, combinable with any of the previous aspects, the mapping defines associations between the remediation rule definitions and data table types indicated by metadata of the data tables. In another aspect, combinable with any of the previous aspects, the remediation plans are applied according to a sequence corresponding to a relationship between the data tables defined by the metadata of the data tables. In another aspect, combinable with any of the previous aspects, the computer-implemented method further includes: performing, by the one or more processors, a validation of the corrected entries.

In another aspect, combinable with any of the previous aspects, the conditions include restrictions supporting a form of replacement remediations. In another aspect, combinable with any of the previous aspects, the placeholder parameters include constant parameters corresponding to a column value type or a row value type of a respective erroneous entry. In another aspect, combinable with any of the previous aspects, the computer-implemented method further includes: generating, by the one or more processors, a report indicating corrected entries modified by the remediation plan. In another aspect, combinable with any of the previous aspects, at least one of the remediation rule definitions includes a first mapping of the remediation rule definitions to a first data table of the plurality of data tables. In another aspect, combinable with any of the previous aspects, the computer-implemented method further includes: identifying, by the one or more processors, a second data table including a structure similar to the first data table; and generating by the one or more processes a recommendation for a second mapping of the remediation rule definition to the second data table.

These and other implementations can each optionally include one or more of the following advantages. The described rule remediation replacement actions are integrated with the rules instead of being a disconnected step, such that data collection is automatically triggered leading to an optimization of dataset remediation. The described approach can implement powerful lookup and best record functions for rule remediation replacement actions, which minimizes or eliminates corrupted and inconsistent data records. Remediation data preparation replacement steps of the described implementations can be auto generated from rule remediation replacement actions. Rule remediation replacement actions, as described, are less error prone, easier to run, and easier to test because a user does not have to manually interpret how to fix failed rows in a remediation preparation for replacements. Rule remediation actions leverage outputs of prediction models based on artificial intelligence to suggest previous remediation actions for new datasets with similar structures. The described prediction models can also be leveraged to generate the rule remediation action definitions for optimization of data correction process.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 3A depicts an example of an incorrectly adjusted dataset, in accordance with implementations of the present disclosure.

FIG. 3B depicts an example of a correctly adjusted dataset, in accordance with implementations of the present disclosure.

Like reference symbols in the various drawings indicate like elements.

DETAILED DESCRIPTION

Figure 1:
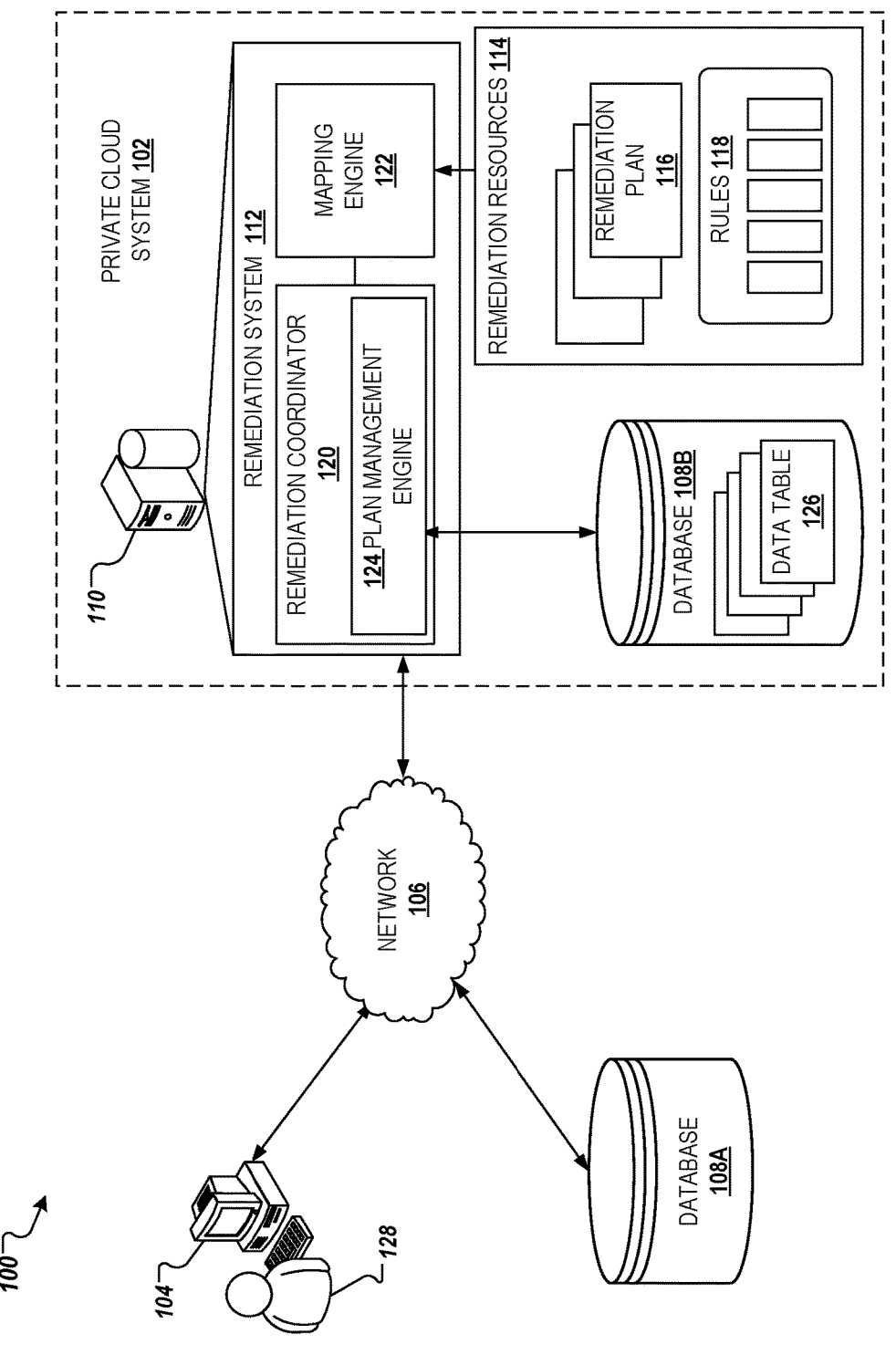
FIG. 1 depicts an example system in accordance with implementations of the present disclosure.

Implementations of the present disclosure are directed to data quality rules. More particularly, implementations of the present disclosure are directed to rule remediation replacement actions automatically triggered by identification of erroneous entries of a data table, potentially affecting an application. The replacement remediation actions can be implemented according to remediation rule definitions. The remediation rule definitions define simple or complex replacements of erroneous entries of data tables to remedy the erroneous entries of the data tables. The correction of erroneous entries of the data tables can include a combination of multiple replacement remediation actions defined in a remediation plan.

The replacement remediation actions can correct erroneous data table entries by applying various correction approaches. For example, some data quality rules can be written to validate data table entries by verifying that the values in a section of the data table (e.g., column or row) match a data type, are within a particular range, are not null nor empty, include a particular format, or include a value from a particular set of values. The correction of data that fails rule remediation traditionally includes generation and replication to a separate table that is scheduled for a later date and/or time. Traditionally, a user evaluates the information about the reason for a rule failure and attempts to correct erroneous data table entries and update the original data source by reintroducing the correct data. The correction of erroneous entries of the data tables can be disrupted by coexistent problems, or if the information about the reason of rule failure is incomplete. For example, the correction of erroneous entries of the data tables can include replacement of an empty value with another value, replacement of one value or format with another value or format, replacement of a value from the same section (e.g., column or row) or another section from another record or from a lookup table. Generating a sequence of adequate corrections can be a challenging task. For example, if the remediations are not connected to the rules, it is complicated to generate a correct workflow of table entry replacements.

Addressing the limitations of traditional correction mechanisms of erroneous data table entries, the approach described in the present disclosure provides optimized and consistent correction of data table entries using prediction models. The prediction models can predict remediation possibilities of a sequence of rule actions including repeatable automated corrections based on several remediation factors. The remediation factors include usage tracking, content type associations with remediation actions, and replacement of common data errors that the system recognizes. The prediction models can optimize the remediation workflow in terms of efficiency of data processing and accuracy of results.

The described approach provides suggestions for remediation actions that can further enhance the remediation workflow. For example, an entity can have governed, curated, and certified datasets that get new delta load of several million records each day. If one of the delta loads is going to reduce the data quality of the curated dataset, the rule actions can provide auto suggestions for potential remediations, such as adding transformations to remediate the data before proceeding to a subsequent step of the remediation workflow. The remediation transformations can also be visual data driven ways to build and test data entry transformations with a small subset of data. During a training phase of the prediction models, some remediation transformations can be marked as "favorite" such remedial actions and can be saved as templates for future use in connection to mapped remediation rules.

The remediation workflow can include application of weights to the rule actions for determining an optimized sequence of remediation actions. For example, when remediation rules are created, there can be user marked weightage for the severity of a remediation failure and the corresponding level of severity and urgency can be reflected in the rule actions. Further advantages of the remediation workflow are described in detail with reference to FIGS. 1, 2, 3A-3B, 4A, 4B, and 5.

FIG. 1 depicts an example system 100 in accordance with implementations of the present disclosure. In the depicted example, the example system 100 includes a private cloud system 102, one or more user devices 104, a network 106, and a database 108A. Although shown separately, in some implementations, functionality of two or more components of the example system 100 or the private cloud system 102 can be provided by a single system or server. In some implementations, the functionality of one illustrated example system 100, server, or component can be provided by multiple systems, servers, or components, respectively.

The private cloud system 102 includes one or more server devices 110 hosting a remediation system 112, a database (e.g., processors, memory) 108B, and remediation resources 114 including one or more remediation plans 116 and one or more remediation rules 118. The remediation system 112 includes a remediation coordinating system 120 and a mapping engine 122. The remediation coordinating system 120 includes a plan management engine 124.

In the depicted example, a user 128 interacts with an application executed (as a service) by the user device 104 that accesses data tables 126 stored by the database 108B. In some examples, the user device 104 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some examples, the user devices 104 can communicate with the private cloud system 102 over the network 106.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In the example of FIG. 1, the server device 110 is intended to represent various forms of servers including, but not limited to a web server, an application server, a proxy server, a network server, and/or a server pool. In general, server systems accept requests for applications as services and provides such microservices to any number of user devices (e.g., the user devices 104 over the network 106).

The databases (e.g., processors, memory) 108A, 108B can include any type of database module and persistencies that can take the form of volatile and/or non-volatile memory including, without limitation, magnetic media, optical media, random access memory (RAM), read-only memory (ROM), removable media, or any other suitable local or remote memory component. The databases (e.g., processors, memory) 108A, 108B can store various data records that can be mapped to one or more remediation plans 116 and remediation rules 118 for ensuring data entry correctness. For example, the databases 108A, 108B can store objects or data, including caches, classes, frameworks, applications, backup data, application objects, jobs, web pages, web page templates, database tables, database queries, repositories storing application data and/or dynamic information, and any other appropriate information including any parameters, variables, algorithms, instructions, rules, constraints, or references thereto associated with the purposes of the private cloud system 102. The databases 108A, 108B can be homogeneous such that all microservices related to an application use an in-memory database (e.g., SAP HANA, provided by SAP SE of Walldorf, Germany). In some implementations, the remediation rules 118 can be mapped to data tables 126 of heterogeneous databases 108A, 108B (e.g., a first portion of the microservices use a first database 108A and a second portion of the microservices use a second database 108B) of different types or vendors. Examples of heterogeneous databases 108A, 108B include specialized databases, such as graph databases, vector databases, time-series databases or other database types related to particular microservice functions. In some implementations, other forms of persistencies can be used, for example, object datastores.

The remediation system 112 can provide remediation commands that can verify integrity and correctness of data entries of data tables 126 stored in different databases 108A, 108B using the remediation resources 114 of the private cloud system 102. The remediation resources 114 represent resources that are provisioned within the private cloud system 102 for use by the remediation system 112. Example remediation resources 114 can include, without limitation, remediation plans 116, rules 118, database systems, applications, servers, physical machines, virtual machines, containers, and the like. In some examples, the remediation mechanism for the data tables 126 can be provisioned within the private cloud system 102 and can be automatically adjusted according to remediation plans 116 or in response to remediation demands received from the user devices 104 (e.g., in response to an error detected by an application executed by the user device 104).

The plan management engine 124 executes the remediation plans 116 for each data tables 126 according to remediation rules 118 mapped to data tables, by the mapping engine 122. The plan management engine 124 provides an order of execution of remedial actions to correct erroneous entries of the data tables 126. A change entered in the local database 108B can be identified as an erroneous entry of the data table 126 that triggers a remediation plan including a remediation operation (e.g., action to correct the change to match data type characteristics and requirements). Each of the plan management engine 124 and the mapping engine 122 can include a prediction model.

The prediction model can be a trainable artificial intelligence model (e.g., machine learning model). The prediction model can include various layers of a neural network process machine learning inferences by performing large quantities of computations (e.g., matrix multiplications). Computation processes performed within a neural network layer (e.g., a convolutional layer) can include multiplying an input activation (e.g., a first operand) with a weight (i.e., a second operand) on one or more cycles and performing an accumulation of products over many cycles. An output activation is generated based on multiply and accumulation operations performed on the two operands.

The mapping engine 122 can include a prediction model trained to predict remediation actions applicable to particular erroneous entries of the data table 126 based on several mapping factors (e.g., usage tracking, content type associations with remediation actions, and replacement of common data errors that the mapping engine 122 recognizes according to mapping patterns). In other words, the trained prediction model of the mapping engine 122 can map the erroneous entries of the data table 126 to remediation operations that can be provided as input features for the training of the machine learning model. For example, the mapping engine 122 can convert each erroneous entry of the data table 126 and associated metadata (reflecting data types and/or data value ranges) to predict remediation operations that can replace the erroneous data entry with correct data entries.

During a training phase of the prediction models of the mapping engine 122, some remediation operations can be marked as "favorite" and can be saved as templates for future use in connection to mapped remediation rules. The identified remediation operations can be provided by the mapping engine 122 to the plan management engine 124 to generate a remediation workflow.

The plan management engine 124 can include a prediction model trained to predict an optimized remediation workflow in terms of efficiency of replacement of interrelated data entries with a high accuracy of results. The prediction model includes a machine learning model that can be trained using as input a training dataset with sequences of remediation actions and erroneous data entries throughout multiple interrelated data tables. The selection of an optimized remediation workflow can reduce processing complexity and automatically provides consistency across use-cases by avoiding repeated replacement of a particular entry that would be required by an incorrectly executed order of error corrections that can erase corrected errors or can generate new errors related to discrepancies between data table entry relationships. For example, the plan management engine 124 can be trained to predict an optimized remediation workflow, resulting in correction of multiple interrelated data entries without repeated operations being applied to a particular field of a data table 126. The remediations (or correction operations) can be provided to the training system as input features, and the operations-event characteristics contain correction values that can be provided to the training system as target outputs.

The plan management engine 124, during training phase, can select the type of machine learning model to be trained, e.g., pick a predefined or default type of machine learning model, or analyze the input features and the target outputs to identify a particular type of machine learning model. For example, types of machine learning models can include a gradient boosted trees model, a generalized linear model, a support vector machine, a decision tree model, or a neural network model, e.g., a multilayer perceptron (MLP). The machine learning models can be trained using machine learning training algorithms such as minimizing an error, computing a gradient, or performing backpropagation.

In some implementations, the training system can use the metadata corresponding to the data tables 126 to preprocess the values of the remediation operation-event characteristics to provide to the training system. For example, by using metadata that identifies the type of data for the values, the remediation system 112 can preprocess the values so that the training of the plan management engine 124 can more accurately correct erroneous entries of the data tables 126 using an optimized remediation workflow.

During a training phase of the prediction models, some remediation workflows can be marked as "favorite" sequences of remedial actions and can be saved as templates for future use in connection to remediation of interrelated data tables. The remediation workflow can include application of weights to the rule actions for determining an optimized sequence of remediation actions. For example, when remediation rules are created, there can be user marked weightage for the severity of a remediation failure and the corresponding level of severity and urgency can be reflected in the remediation rule actions.

Figure 2:
FIG. 2 is a diagram of an example erroneous dataset, in accordance with implementations of the present disclosure.

FIG. 2 is a diagram of an example erroneous dataset 200, in accordance with implementations of the present disclosure. The example erroneous dataset 200 illustrates an example data table that can be processed, by a remediation system (e.g., the remediation system 112, described with reference to FIG. 1) to identify erroneous data entries (e.g., missing or incorrect). The remediation system can process the field headers and the data entries to correct the identified erroneous data.

The example erroneous dataset 200 includes a header row with multiple field headers 202, 204, 206, 208, 210, 212, 214 and a data entry row including multiple data entries (fields) 222, 224, 226, 228, 230, 232, 234. The field headers 202, 204, 206, 208, 210, 212, 214 can indicate data types within a column associated with a respective header. In the illustrated example of FIG. 2, two data entries 228, 230 corresponding to the phone 208 and the e-mail 210 are null. A mapping engine (e.g., the mapping engine 122, described with reference to FIG. 1) can indicate that the two data entries 228, 230 are set to include (not null) values according to a format of the data type indicated by the respective headers 208, 210 that can be corrected using respective remediation actions.

The remediation actions can include replacement of null data entry 228 (phone number) with lookup value ($custID) and additional values (e.g., prefix and extensions). The lookup function can match multiple rows and maximum return values using rule action cases including replacement of null phone with lookup value from same column in same table (from another row), from another column in same table (from same row or another row), from same column in another table (from another row), from another column in another table (from another row). In some implementations, the lookup function can match multiple rows and maximum return values selected by a "best record" choice determined by a trainable machine learning model as described with a reference to FIG. 1. The best record functions can include newest, oldest, most frequent, least frequent, longest, maximum, shortest, minimum, random, or tiebreaker including one or more remediation operations here that can be selected by the trained machine learning model.

FIG. 3A depicts an example of an incorrectly adjusted dataset 300A, in accordance with implementations of the present disclosure and FIG. 3B depicts an example of a correctly adjusted dataset 300B, in accordance with implementations of the present disclosure. The incorrectly adjusted dataset 300A can be generated by a non-optimal remediation workflow (or a partially executed remediation workflow) and the example correctly adjusted dataset 300B can be generated by an optimal (completely executed) remediation workflow. The example incorrectly adjusted dataset 300A can include an incorrectly remediated data entry 302A that does not match a data type length and structure of phone values and a correctly remediated data entry 304 that match a data type length and structure of email values. The example correctly adjusted dataset 300A can include a correctly remediated data entry 302B that matches a data type length and structure of phone values and a correctly remediated data entry 304 that match a data type length and structure of email values.

Within the context of the illustrated example, a workflow to correct the example erroneous dataset 200 to generate the adjusted dataset 300A, 300B includes: 1) identifying a mapped rule for each of the erroneous data entries (e.g., "Phone cannot be NULL"); 2) using the rule in one or more rulebooks to identify mapped remediation operation(s); 3) executing the remediation data preparation for the erroneous data entries (limited to failed fields); 4) generating a remediation plan including remediation operations for replacements of erroneous data entries; 5) re-executing the remediation preparation to inspect the output rows of an intermediary output (the incorrectly adjusted dataset 300A); 6) adjusting the remediation plan including updated remediation operations for replacements of remaining (or newly introduced) erroneous data entries and execute the adjusted remediation plan; and 7) Any remaining error message entry data can trigger an execution of the workflow.

The rules in the rulebooks can include creation of rule bindings for each dataset using a mapped rule in a rulebook, execution of the rulebook(s), specification that a remediation data preparation to be created for the failed rows, application of remediations to a section of data tables according to remediation data preparation. Remediation plan adjustments can be triggered by identification that the current data entries do not satisfy one or more conditions associated with the remediation rules or validation failed.

Figure 4A:
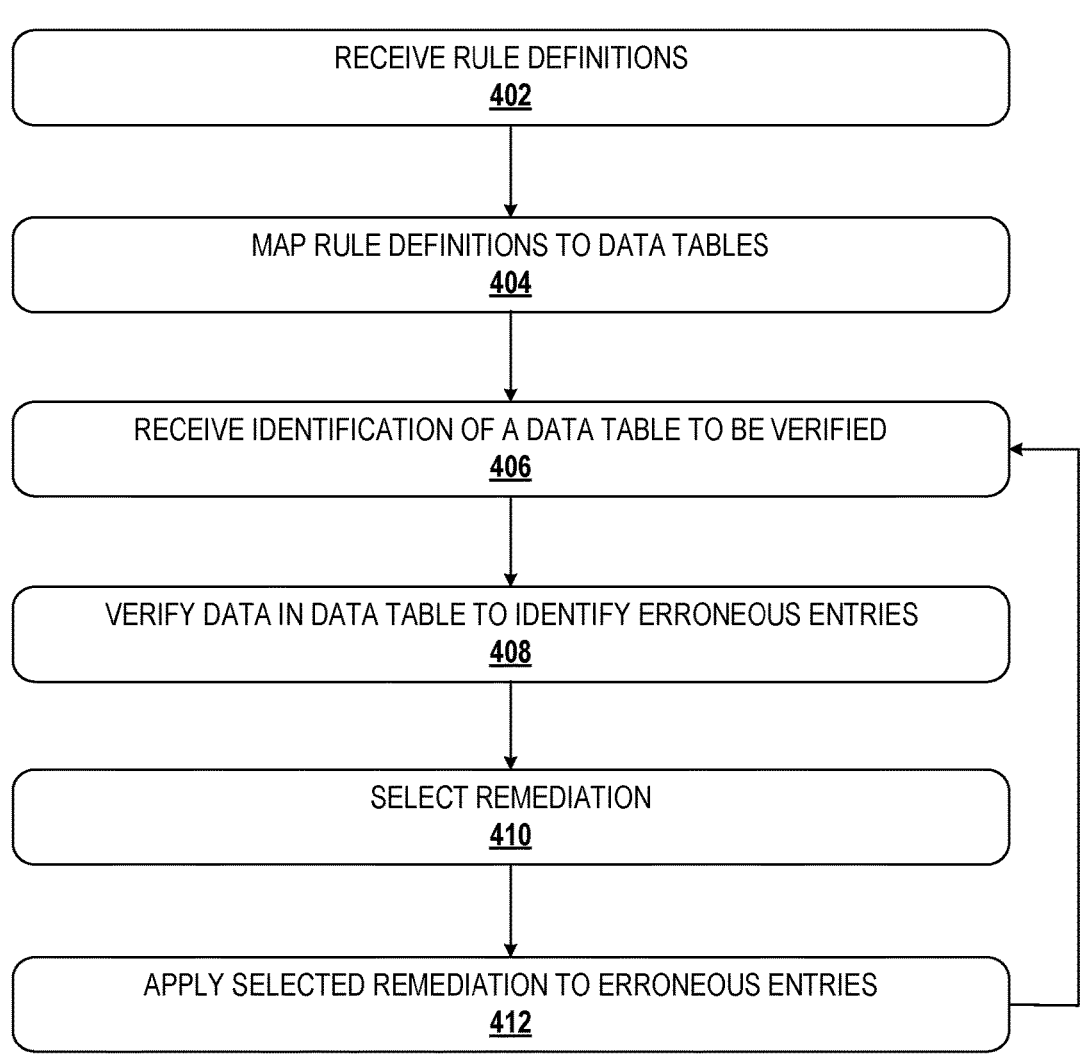
FIG. 4A depicts an example remediation process that can be executed in accordance with implementations of the present disclosure.

FIG. 4A depicts an example remediation process 400 that can be executed in accordance with implementations of the present disclosure. In some examples, the example process 400 is provided using one or more computer-executable programs executed by one or more computing devices, such as a remediation system 112 of the private cloud system 102 described with reference to FIG. 1 or an example computing system 500 described with reference to FIG. 5.

At 402, remediation rule definitions are received. The remediation rule definitions can include replacement remediation action defining placeholder parameters and conditions for replacing erroneous entries of data tables to remedy the erroneous entries of the data tables. The remediation rule definitions include an action name, an action description, and a script that defines the replacement action. A single remediation action is included in each rule. The remediation rule definitions include a link to a glossary entry for custom attributes. The conditions include restrictions supporting a form of replacement remediations. The placeholder parameters include constant parameters corresponding to a column value type or a row value type of a respective erroneous entry. In some implementations, a column placeholder parameter can be provided to have a potential replacement made to it as well as column placeholders for other columns involved, and a table placeholder.

At 404, the remediation rule definitions are mapped to the data tables using a mapping that can be stored in a database. The mapping defines associations between the remediation rule definitions and data table types indicated by metadata of the data tables. The mapping of each data type (column) can be indicated by the metadata of the respective data tables. In some implementations, at least one of the remediation rule definitions includes a first mapping of the remediation rule definitions to a first data table of the plurality of data tables. A second data table including a structure similar to the first data table can be identified and a recommendation for a second mapping of the remediation rule definition to the second data table can be generated.

At 406, an identification of one or more data tables to be verified is received. The data table can be automatically identified by an application that encountered an error in execution or can be identified in response to a modification to the data table or according to a verification schedule. The data table can include multiple data entries structured as rows and columns as described with reference to FIGS. 2, 3A, and 3B.

At 408, data entries of the one or more data tables are verified to identify erroneous data entries in the one or more data tables. The verification of the data entries includes an analysis of the data entries using respective conditions, such as comparing the data entries to an assigned data type, verifying that the data value is within a particular range, verifying that the data value not being null nor empty, verifying that the data value includes a particular format, or by verifying that the data value is from a particular set of values.

At 410, remediation plans are selected using a prediction model. In some example implementations, the machine learning model can be subjected to supervised pre-training, for example, to perform a selection of remediation plans for interrelated data tables. The machine learning model can be fine-tuned to optimize the sequence of remediation actions within the remediation plans to minimize the use of processing resources, by avoiding repeated remediation actions applied to the same data entries.

The fine-tuning of the first machine learning model can include adjusting weights applied to remediation actions relative to data entry types. For example, the weights applied by the machine learning model can be adjusted through backpropagation of the error (or another optimization technique) present in the data tables. As noted, the weights applied by the machine learning model can be adjusted during a temporary fine-tuning, the weights applied by the machine learning model can remain static to prevent drift and unstable behavior (e.g., loss oscillations and/or the like) after the error of the prediction drops below a particular threshold. The verification of the error can be performed according to a set frequency, and the readjustment of the weights can be reimplemented at any time the error level exceeds the acceptable error level.

The optimization provided by the predictive models allows private cloud deployments to keep the hardware capacity at a minimum to save costs. The remediation plans include a remediation workflow listing a sequence of applicable remediation actions mapped to the one or more data tables. A remediation plan can be derived from one or more remediation rule definitions to correct the erroneous entries in each of the one or more data tables.

For example, a remediation plan can be derived for a rule that checks if a placeholder column is null then replace it with a constant. The "if" check can support one or more column placeholders, which are identifiable by requiring that they start with a "$." A more complex if expression can be allowed including multiple AND/OR logic and "else if" and "else" statements as shown in the following code.

```
DECLARE
    #define variables
BEGIN
    if ($Col.1==null){
        REPLACE("constant")
    }
END
```

As another example, a comparison rule can be applied to trigger a remediation action, as shown in the following code.

```
DECLARE
    #define variables
BEGIN
    if ($Col.1==($Col_compare){
        REPLACE("constant")
    }
END
```

As another example, a lookup replacement can be triggered in response to determining that a column value equals a particular value of a comparison column. Placeholders can be specified for a connection, for a table, and for a replacement column. The remediation action can include a replacement of a column value with a value from a different column in the same row.

```
DECLARE
    #define variables
BEGIN
    if ($Col.1==($Col_compare){
        REPLACE(LOOKUP($connection, $table, $col_replace))
    }
END
```

As yet another example, a lookup replacement can be triggered in response to determining that a column equals a particular value of a comparison column. Placeholders can be specified for a connection and table and a replacement column placeholder as well as some lookup column key placeholders. The remediation action can include a replacement of a column value with a value from a same or different column from a different row and may return multiple rows.

```
DECLARE
    #define variables
BEGIN
    if ($Col.1==($Col_compare){
        REPLACE(LOOKUP($connection, $table1,
[$coL_key1, $coL_key2,...], $col_replace, $dflt_val|value))
    }
END
```

At 412, the remediation plan is applied to replace the erroneous entries in the one or more data tables with corrected entries . . . the remediation plans are applied according to a sequence corresponding to a relationship between the data tables defined by the metadata of the data tables. In response to completing the remediation plan, a validation of the corrected entries can be performed to verify that no other erroneous data entries exist in the data tables. If other erroneous data entries exist in the data tables, the example process 400 can be repeated to correct all erroneous data entries. In some implementations, a report indicating corrected entries modified by the remediation plan can be generated and transmit it to a user device to be displayed by a graphical user interface.

Figure 4B:
FIG. 4B depicts an example remediation validation process that can be executed in accordance with implementations of the present disclosure.

FIG. 4B depicts an example remediation validation process 420 that can be executed in accordance with implementations of the present disclosure. In some examples, the example process 400 is provided using one or more computer-executable programs executed by one or more computing devices, such as a remediation system 112 of the private cloud system 102 described with reference to FIG. 1 or an example computing system 500 described with reference to FIG. 5.

At 422, an identification of a data table is received. The data table can be automatically identified by an application that encountered an error in execution or can be identified in response to a modification to the data table or according to a verification schedule. The data table can include multiple data entries structured as rows and columns as described with reference to FIGS. 2, 3A, and 3B.

At 424, a rulebook is executed to determine a quality of included rules relative to data types included in the data tables. The rulebook includes rules defining remediation actions to be applied in response to determining that a data entry of a data table does not satisfy one or more conditions. The rulebook can be generated by importing select rules and mapping (e.g., binding) the rules to data tables (datasets and their columns). The rulebook can include different rules that fit the use case being monitored and mapping the rules to one or more datasets one or more times for different data types (e.g., columns). For example, a simple replace rule remediation action can be added to the rulebook. The addition of the replace rule can trigger a request for mapping the newly added replace rule to a column from a list of columns from the dataset to choose from to map to the column placeholder in their rule action script.

A rule remediation action includes various placeholders in its definition, which are filled in when binding a rulebook for rulebook execution. The rules in the rulebooks can include creation of rule bindings for each dataset using a mapped rule in a rulebook, execution of the rulebook(s), specification that a remediation data preparation to be created for the failed rows, application of remediations to a section of data tables according to remediation data preparation.

When a rule is added to a rulebook, the mapping (e.g., binding) information for the rule actions can be added for a particular dataset and can be tested on a sample of real user data. Alternatively, the mapping can be filled in when creating a remediation preparation.

At 426, a data sample is generated for testing at least a portion of the rule book, by testing each rule individually and in relation with other interrelated data entries and rules. The testing can be performed as a training of a prediction model, such as a machine learning model, as described with reference to FIG. 1. The rulebook can be executed to specify a remediation for one or more of the datasets that are being validated by the rulebook. The rulebook is executed and a sample of failed records for each rule is generated from the full list of rows processed by the rulebook to build the remediation from. The rulebook can be parsed to find each rule that is bound to the dataset and have failed data associated with it. The rule actions can be parsed to use the action script, input mappings, and action mappings to build a set of remediation actions to fix the rows failing a particular rule.

At 428, a remediation preparation is generated with sample data and a remediation plan. The remediation preparation is generated using the sample failed data from the rulebook execution along with a set of recipes derived from the rule actions. The remediation preparation is based on rule actions that can turn into data preparation recipe actions. The remediation preparation can include lookup actions to do replacements of erroneous data entries in data table.

At 430, a remediation plan is validated. The validation can include a pre-review of the planned remediation actions generated from the rules in the preparation user interface that allows real time view of changes that are made with the ability to enable/disable/delete the pre-defined changes along with adding one or more supplementary changes. The pre-review can be limited to a portion of the data table that is smaller than the complete dataset.

In response to determining that the pre-review indicates that a quality of the remediation plan exceeds a set threshold, the remediation plan can be validated on the full dataset. Any errors found on the full dataset can be fixed in the current preparation or do a fix in the rule and rule action and then have the rulebook be re-run to regenerate a new remediation plan with the updated actions.

The review and fix processes can be very time intensive to find and fix all the errors in the dataset. The remediation plan can support multiple forms of replacement remediations ranging from very simple replacements to complex lookup replacements. The validation includes a verification that a predicted outcome of the remediation actions generates data entries that do not conflict with each other and satisfy the conditions applied to the data entries by matching an assigned data type, being within a particular range, by not being null nor empty, by including a particular format, or by including a value from a particular set of values.

At 432, actions of the remediation plan are refined such that each action corresponds to a single data entry that can be interrelated to other data entries. The refinement can be conditioned by analyzing effects of applying the action to one data entry that can affect the value of the related data entries.

The remediation actions can be extended to better match a larger set of functions that can be used with the generated rules that can be compatible with a particular set of data types. The remediation action extension can include using expressions to access all rows in the table when updating a row and being able to use other tables as lookup tables using connections identified by a prediction model. As rules allow for many columns to be mapped in and lookup functions to reference other tables, remediation actions can also leverage similar functionality of referencing any column in the dataset or accessing tables outside the one that is being processed.

At 434, the remediation plan is executed on the complete data table. The remediation plan can be applied automatically according to rule bindings and can be displayed on a graphical user interface.

At 436, the remediation results are validated by comparing the data entries to their associated conditions to confirm that the output is free of errors. If any data entry offer the data tables is identified as still including erroneous data, the actions of the remediation plan can be refined.

The example processes 400 and 420 advantageously enable optimized remediation of erroneous data entries in data tables. The example process 400 provides an automated mechanism to identify remediation plans optimized for correction of erroneous data entries in data tables. Without an automated mechanism to identify remediation plans, the task can be very cumbersome and time-consuming due to the interrelation between multiple data tables. Identification and correction of erroneous data entries in data tables, is essential to enable access to applications. The execution of remediation across data tables can be improved by automatically executing validation operations. The benefit of the example processes 400 and 420 stems from a consistent way to solve errors, which results in higher-quality, consistent datasets.

Improving the functions supported by the remediation plan can significantly increase the error complexity scenarios that can be solved. For example, traditional remediation techniques include manual replacement of large sets of values that has an intrinsic risk of introducing new errors. The rules used by the example processes 400, can be extended to be mapped to any number of columns (e.g., hundreds or thousands), generating actions that can optimize remediation, avoiding introduction of additional errors.

Figure 5:
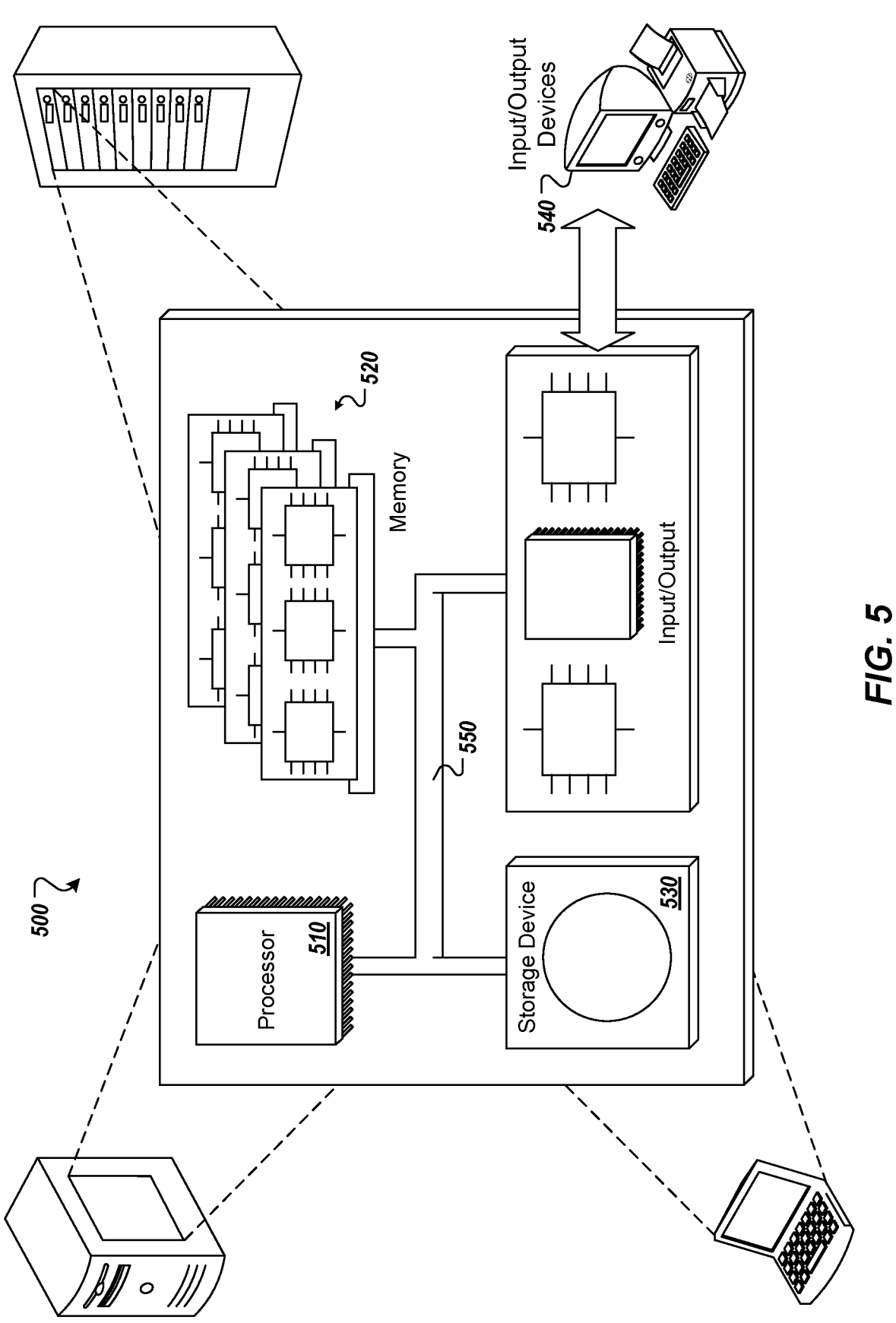
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 can be included in any or all of the server components discussed herein, such as the components of the example system 100 described with reference to FIG. 1. The system 500 includes a processor 510, a memory 520, a storage device 530, and an input/output device 540. The components 510, 520, 530, 540 are interconnected using a system bus 550. The processor 510 is capable of processing instructions for execution of processes (e.g., example process 300 described with reference to FIG. 3) within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 can be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a particular activity or bring about a particular result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random-access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other implementations are within the scope of the following claims.

A number of implementations of the present disclosure have been described. Nevertheless, it will be understood that various modifications can be made without departing from the spirit and scope of the present disclosure. Accordingly, other implementations are within the scope of the following claims.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application.

Example 1. A computer-implemented method comprising: receiving, by one or more processors, remediation rule definitions comprising a replacement remediation action defining placeholder parameters and conditions for replacing erroneous entries of a plurality of data tables to remedy the erroneous entries of the plurality of data tables; mapping, by the one or more processors, the remediation rule definitions to the plurality of data tables; receiving, by the one or more processors, an identification of one or more data tables to be verified; verifying, by the one or more processors, data of the one or more data tables to identify erroneous entries in the one or more data tables; selecting, by the one or more processors, using a prediction model, from a plurality of remediation plans comprising applicable remediation rule definitions mapped to the one or more data tables, a remediation plan comprising one or more remediation rule definitions to correct the erroneous entries in each of the one or more data tables; and applying, by the one or more processors, the remediation plan to replace the erroneous entries in the one or more data tables with corrected entries.

Example 2. The computer-implemented method of example 1, wherein the remediation rule definitions comprise a link to a glossary entry for custom attributes.

Example 3. The computer-implemented method of any of the preceding examples, wherein the mapping defines associations between the remediation rule definitions and data table types indicated by metadata of the data tables.

Example 4. The computer-implemented method of any of the preceding examples, wherein the remediation plans are applied according to a sequence corresponding to a relationship between the data tables defined by the metadata of the data tables.

Example 5. The computer-implemented method of any of the preceding examples, further comprising: performing, by the one or more processors, a validation of the corrected entries.

Example 6. The computer-implemented method of any of the preceding examples, wherein the conditions comprise restrictions supporting a form of replacement remediations.

Example 7. The computer-implemented method of any of the preceding examples, wherein the placeholder parameters comprise constant parameters corresponding to a column value type or a row value type of a respective erroneous entry.

Example 8. The computer-implemented method of any of the preceding examples, further comprising: generating, by the one or more processors, a report indicating corrected entries modified by the remediation plan.

Example 9. The computer-implemented method of any of the preceding examples, wherein at least one of the remediation rule definitions comprises a first mapping of the remediation rule definitions to a first data table of the plurality of data tables.

Example 10. The computer-implemented method of claim 9, further comprising: identifying, by the one or more processors, a second data table comprising a structure similar to the first data table; and generating by the one or more processes a recommendation for a second mapping of the remediation rule definition to the second data table.

Example 11. A computer-implemented system comprising: one or more computers; and one or more computer memory devices interoperably coupled with the one or more computers and having tangible, non-transitory, machine-readable media storing one or more instructions that, when executed by the one or more computers, perform one or more operations comprising: receiving remediation rule definitions comprising a replacement remediation action defining placeholder parameters and conditions for replacing erroneous entries of a plurality of data tables to remedy the erroneous entries of the plurality of data tables; mapping the remediation rule definitions to the plurality of data tables; receiving an identification of one or more data tables to be verified; verifying data of the one or more data tables to identify erroneous entries in the one or more data tables; selecting using a prediction model, from a plurality of remediation plans comprising applicable remediation rule definitions mapped to the one or more data tables, a remediation plan comprising one or more remediation rule definitions to correct the erroneous entries in each of the one or more data tables; and applying the remediation plan to replace the erroneous entries in the one or more data tables with corrected entries.

Example 12. The computer-implemented system of example 11, wherein the remediation rule definitions comprise a link to a glossary entry for custom attributes.

Example 13. The computer-implemented system of any of the preceding examples, wherein the mapping defines associations between the remediation rule definitions and data table types indicated by metadata of the data tables.

Example 14. The computer-implemented system of any of the preceding examples, wherein the remediation plans are applied according to a sequence corresponding to a relationship between the data tables defined by the metadata of the data tables.

Example 15. The computer-implemented system of any of the preceding examples, wherein the operations further comprise: performing a validation of the corrected entries.

Example 16. The computer-implemented system of any of the preceding examples, wherein the conditions comprise restrictions supporting a form of replacement remediations.

Example 17. The computer-implemented system of any of the preceding examples, wherein the placeholder parameters comprise constant parameters corresponding to a column value type or a row value type of a respective erroneous entry.

Example 18. The computer-implemented system of any of the preceding examples, wherein the operations further comprise: generating a report indicating corrected entries modified by the remediation plan.

Example 19. The computer-implemented system of any of the preceding examples, wherein at least one of the remediation rule definitions comprises a first mapping of the remediation rule definitions to a first data table of the plurality of data tables, wherein the operations further comprise: identifying a second data table comprising a structure similar to the first data table; and generating by the one or more processes a recommendation for a second mapping of the remediation rule definition to the second data table.

Example 20. A non-transitory computer-readable media encoded with a computer program, the computer program comprising instructions that when executed by one or more computers cause the one or more computers to perform operations comprising: receiving remediation rule definitions comprising a replacement remediation action defining placeholder parameters and conditions for replacing errone- ous entries of a plurality of data tables to remedy the erroneous entries of the plurality of data tables; mapping the remediation rule definitions to the plurality of data tables; receiving an identification of one or more data tables to be verified; verifying data of the one or more data tables to identify erroneous entries in the one or more data tables; selecting using a prediction model, from a plurality of remediation plans comprising applicable remediation rule definitions mapped to the one or more data tables, a reme- diation plan comprising one or more remediation rule defi- nitions to correct the erroneous entries in each of the one or more data tables; and applying the remediation plan to replace the erroneous entries in the one or more data tables with corrected entries.

What is claimed is:

1. A computer-implemented method comprising:
   receiving, by one or more processors, remediation rule definitions comprising a replacement remediation action defining placeholder parameters and conditions for replacing erroneous entries of a plurality of data tables to remedy the erroneous entries of the plurality of data tables;
   mapping, by the one or more processors, the remediation rule definitions to the plurality of data tables;
   receiving, by the one or more processors, an identification of one or more data tables to be verified;
   verifying, by the one or more processors, data of the one or more data tables to identify erroneous entries in the one or more data tables;
   selecting, by the one or more processors, using a predic- tion model, from a plurality of remediation plans com- prising applicable remediation rule definitions mapped to the one or more data tables, a remediation plan comprising one or more remediation rule definitions to correct the erroneous entries in each of the one or more data tables, the prediction model being trained to select the remediation plan by optimizing a remediation workflow defining a sequence of replacement of inter- related data entries to remediate the erroneous entries; and
   applying, by the one or more processors, the remediation plan to replace the erroneous entries in the one or more data tables with corrected entries according to the sequence of replacement of interrelated data entries.

2. The computer-implemented method of claim 1, wherein the remediation rule definitions comprise a link to a glossary entry for custom attributes.

3. The computer-implemented method of claim 1, wherein the mapping defines associations between the reme- diation rule definitions and data table types indicated by metadata of the data tables.

4. The computer-implemented method of claim 3, wherein the remediation plans are applied according to a sequence corresponding to a relationship between the data tables defined by the metadata of the data tables.

5. The computer-implemented method of claim 1, further comprising:
   performing, by the one or more processors, a validation of the corrected entries.

6. The computer-implemented method of claim 1, wherein the conditions comprise restrictions supporting a form of replacement remediations.

7. The computer-implemented method of claim 1, wherein the placeholder parameters comprise constant parameters corresponding to a column value type or a row value type of a respective erroneous entry.

8. The computer-implemented method of claim 1, further comprising:
   generating, by the one or more processors, a report indicating corrected entries modified by the remedia- tion plan.

9. The computer-implemented method of claim 1, wherein at least one of the remediation rule definitions comprises a first mapping of the remediation rule definitions to a first data table of the plurality of data tables.

10. The computer-implemented method of claim 9, fur- ther comprising:
    identifying, by the one or more processors, a second data table comprising a structure similar to the first data table; and
    generating by the one or more processes a recommenda- tion for a second mapping of the remediation rule definitions to the second data table.

11. A computer-implemented system comprising:
    one or more computers; and
    one or more computer memory devices interoperably coupled with the one or more computers and having tangible, non-transitory, machine-readable media stor- ing one or more instructions that, when executed by the one or more computers, perform one or more opera- tions comprising:
       receiving remediation rule definitions comprising a replacement remediation action defining placeholder parameters and conditions for replacing erroneous entries of a plurality of data tables to remedy the erroneous entries of the plurality of data tables;
       mapping the remediation rule definitions to the plural- ity of data tables;
       receiving an identification of one or more data tables to be verified;
       verifying data of the one or more data tables to identify erroneous entries in the one or more data tables;
    selecting using a prediction model, from a plurality of remediation plans comprising applicable remediation rule definitions mapped to the one or more data tables, a remediation plan comprising one or more remediation rule definitions to correct the erroneous entries in each of the one or more data tables, the prediction model being trained to select the remediation plan by opti- mizing a remediation workflow defining a sequence of replacement of interrelated data entries to remediate the erroneous entries; and
       applying the remediation plan to replace the erroneous entries in the one or more data tables with corrected entries according to the sequence of replacement of interrelated data entries.

12. The computer-implemented system of claim 11, wherein the remediation rule definitions comprise a link to a glossary entry for custom attributes.

13. The computer-implemented system of claim 11, wherein the mapping defines associations between the reme- diation rule definitions and data table types indicated by metadata of the data tables.

14. The computer-implemented system of claim 13, wherein the remediation plans are applied according to a sequence corresponding to a relationship between the data tables defined by the metadata of the data tables.

15. The computer-implemented system of claim 11, wherein the operations further comprise:

performing a validation of the corrected entries.

16. The computer-implemented system of claim 11, wherein the conditions comprise restrictions supporting a form of replacement remediations.

17. The computer-implemented system of claim 11, wherein the placeholder parameters comprise constant parameters corresponding to a column value type or a row value type of a respective erroneous entry.

18. The computer-implemented system of claim 11, wherein the operations further comprise:

generating a report indicating corrected entries modified by the remediation plan.

19. The computer-implemented system of claim 11, wherein at least one of the remediation rule definitions comprises a first mapping of the remediation rule definitions to a first data table of the plurality of data tables, wherein the operations further comprise:

identifying a second data table comprising a structure similar to the first data table; and generating by the one or more processes a recommendation for a second mapping of the remediation rule definitions to the second data table.

20. A non-transitory computer-readable media encoded with a computer program, the computer program comprising instructions that when executed by one or more computers cause the one or more computers to perform operations comprising:

receiving remediation rule definitions comprising a replacement remediation action defining placeholder parameters and conditions for replacing erroneous entries of a plurality of data tables to remedy the erroneous entries of the plurality of data tables;

mapping the remediation rule definitions to the plurality of data tables;

receiving an identification of one or more data tables to be verified;

verifying data of the one or more data tables to identify erroneous entries in the one or more data tables;

selecting using a prediction model, from a plurality of remediation plans comprising applicable remediation rule definitions mapped to the one or more data tables, a remediation plan comprising one or more remediation rule definitions to correct the erroneous entries in each of the one or more data tables, the prediction model being trained to select the remediation plan by optimizing a remediation workflow defining a sequence of replacement of interrelated data entries to remediate the erroneous entries; and applying the remediation plan to replace the erroneous entries in the one or more data tables with corrected entries according to the sequence of replacement of interrelated data entries.

* * * * *